T. M. BRUDE.
INFORMATION INDICATOR.
APPLICATION FILED MAY 26, 1916.

1,258,983.

Patented Mar. 12, 1918.

Inventor.
Thomas M. Brude,
By Chas. L. Byron
Atty.

UNITED STATES PATENT OFFICE.

THOMAS M. BRUDE, OF WINNETKA, ILLINOIS.

INFORMATION-INDICATOR.

1,258,983.  Specification of Letters Patent.  Patented Mar. 12, 1918.

Application filed May 26, 1916. Serial No. 100,040.

*To all whom it may concern:*

Be it known that I, THOMAS M. BRUDE, a citizen of the United States, residing at Winnetka, in the county of Cook and State of Illinois, have invented a new and useful Improvement in connection with Information-Indicators, of which the following is a full, clear, and exact specification.

The invention relates to information indicators, and more particularly to such indicators in connection with geographical, geological, astronomical, biographical maps and statistical and other charts on which cloth-covered, glass, metal or other suitable tacks, pin or signals are used in various colors to indicate points on maps to designate some particular information in connection with same, of which the color of the tacks or pins is a code.
One of the objects of my invention is to supplement and intensify the limited statistics and information formerly possible by the use of tacks and maps alone.

Another object is to facilitate the visualizing of results or the supervising of salesmen on maps, charts, etc.

Another object is to provide simple information indicating members which may be releasably connected to tacks or the like and which may be readily applied and withdrawn, but which are not susceptible to accidental displacement.

Another object is to provide an information indicating combination adapted to meet the various commercial requirements.

These and other objects are accomplished by providing a suitable map or chart, tacks, or the like, associated therewith to indicate some definite information, and suitable releasably connected members associated with said tacks to indicate further definite information.

The invention is illustrated on the accompanying sheet of drawings, in which—

Figure 1 is a view of my information indicating combination, the office map such as commonly used in offices to designate the territory covered being shown in plan view, and the associated tacks and other information indicating members being shown in perspective for the sake of clearness;

The various novel features of my invention will be apparent from the following description and drawings, and will be particularly set forth in the appended claims.

It is common practice for sales managers to observe the movements and results of visits of salesmen by the use of maps or charts and tacks having heads of different colors.

Figure 1:
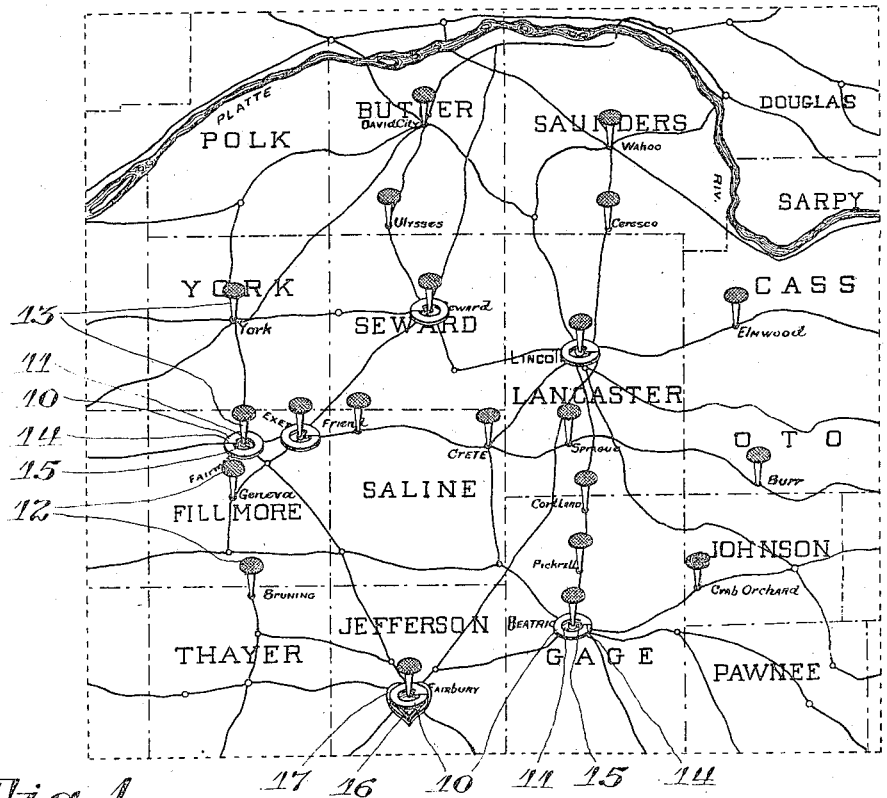
Figure 2:
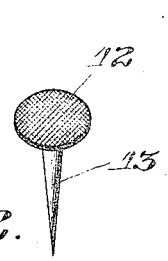
Fig. 2 is a perspective view of the ordinary (colored) tack used in connection with these maps, the head of which tack, being round or flat, is either cloth-covered in various colors, or of glass, or metals in various colors.
Figure 3:
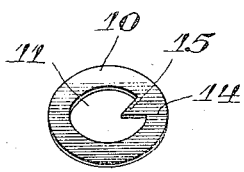
Fig. 3 is a perspective view of my improved information indicating ring or signal which is adapted to be releasably locked on the tacks in question.

In general use the maps, such as the one shown in Fig. 1, are usually divided into sales territories, the differently colored tacks indicating different classes of accounts sold in a town. A checked tack might indicate that a new agency for the products sold by a concern had just been opened up in that town. A black tack would indicate an established agency. A red tack would indicate a dealer's town in which ordinary products are sold, but that no agency is established for the full line of products. A yellow tack would indicate that a special class of accounts, such as jobbers, etc., are being sold regularly. A white tack would indicate a prospective town.

Where it is necessary to check up the calls of the salesmen in the towns in which business is already established, it has been necessary to use a burdensome system, either by inserting another tack denoting a call, or by using a duplicate map in which tacks are placed when salesmen report calls. A black tack would indicate one call, a red tack two calls, a yellow tack three calls in a town, etc. This duplication of maps and the use of two or three tacks at a single spot is very unsatisfactory, to say the least.

To overcome these objections, I have provided in the first place map rings or signals to be used in connection with tacks on the maps, by means of which a double, treble, quadruple, or even greater, number of purposes can be obtained through the use of maps now in force. For example, a ring placed over the head of a tack would indicate a call. The different colors of the rings would indicate results of these calls. A black ring could be placed over the head of a black agency tack to indicate that a call was made in the town and that a sale was made to the agency. If an agency sale was made in a red dealer's town, a yellow jobber's town, or a white prospective town, a black ring would be placed over the tack, which would indicate that a new agency had been sold and that the color of the tack should be changed when shipment of order is made or approved. A red ring placed over the head of a black tack would indicate that a call was made in the agency town but that no sale was made to the agency. In this particular case it would indicate that some other dealer in the town had been sold. If a red ring is placed over a red tack, it means a dealer's sale in a dealer's town. If placed over a yellow tack, it would indicate a dealer's sale in a jobber's town, and if placed over a white tack, would indicate that a dealer had been sold in a town in which no previous business existed. A yellow ring would be used in the same manner. A white ring would indicate that merely a call was made in a town without any sale. Therefore, a white ring over a black tack would mean that an agency was called on but that no sale was made. The same would be true placed over a red dealer's tack, yellow jobber's tack, a checked new agency tack, or a white prospective tack.

While many business firms have various kinds of business in every town, they usually place the tack on the town in question to indicate the most important business being sold. However, in the application of these rings, and where it is not essential to follow the salesmen, the rings could be used to supplement the most important business in the town, as indicated in the tack, and by placing a ring over the head of each tack to indicate the nature of other accounts sold there.

Some firms place different colored tacks in towns on maps to indicate which salesman has jurisdiction over the town in question. In such a case a black tack would mean that salesman No. 1 calls there, and a red tack that salesman No. 2 calls there. This is particularly true of some kinds of business where salesmen are not given defined territories.

Figure 4:
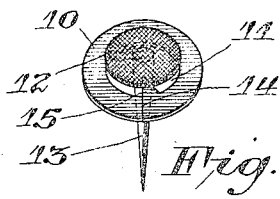
Fig. 4 is a perspective view of a tack and ring, the latter having just been passed over the head of the tack.

In the use of rings in connection with tacks stuck into maps, charts, etc., it is of great importance that the rings be readily placed onto or over the tacks and readily withdrawn therefrom, and at the same time it is of greater importance that the rings must be sufficiently locked or confined to the tacks to prevent their accidental shaking or jarring therefrom. Therefore, I have preferably provided rings 10 made of any suitable flexible material, such, for example, as celluloid, paper, or rubber, having their central opening 11 smaller than the heads 12 of the tacks 13. To readily pass these rings 10 over the heads of the tacks, the rings are slit, preferably radially, as at 14. To lock, or to further confine the rings to the tacks, they are provided with inwardly extending radially arranged pointed projections 15 adjacent the slits 14. The projections 15 positively prevent accidental withdrawal of rings by engaging the under side of the heads 12, as shown in Fig. 4. In this manner it is seen that the rings may be releasably secured or locked to the tacks, and due to their resiliency will always spring into their normal condition or form when free so to do. The rings may be said to be snapped onto the tacks in an embracing manner and likewise snapped off.

Figure 5:
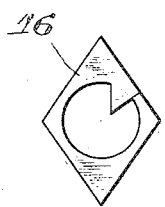
Figs. 5 and 6, respectively, are perspective views of other information indicators used with tacks either alone or in combination with the rings.
Figure 6:
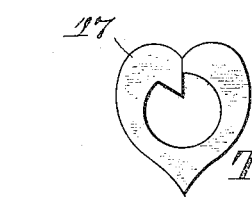

In the application of these rings, the different colored rings might indicate in which towns, agencies, dealers, or other special accounts, are located. In such case diamond-shaped or heart-shaped rings or annular members 16 or 17, as shown in Figs. 5 and 6, might indicate the nature of accounts and the round rings might indicate the supplementary calls, or vice versa. These members may be of various shapes and may serve to indicate various kinds of information. They are made relatively small to cover a minimum amount of space, and preferably are transparent. Of course, suitable pins may be used instead of tacks.

There may be various modifications of my invention, and it is my intention to cover all which do not involve a departure from the spirit and scope thereof as set forth in the following claims.

What I claim as new is:

1. In an information indicating system, the combination of an information indicating member having an enlarged portion, and a removable information indicating member having an aperture smaller than the enlarged portion of said first mentioned member, and having a slit whereby the removable member may be placed over the enlarged portion of the first mentioned member.

2. In an information indicating system, the combination of a tack, and an information indicating member having an aperture smaller than the head of the tack and having a slit whereby the member may be placed over the head of the tack.

3. In an information indicating system, the combination of a tack, and an information indicating member having an aperture smaller than the head of the tack and having a slit whereby the member may be placed over the head of the tack, said member also having a projection to coact with the tack head to prevent accidental withdrawal of the member from the tack.

4. In an information indicating system, the combination of an information indicating member having an enlarged portion, and a removable indicating member having an open center smaller than the enlarged portion of said first mentioned member, the removable member being made of flexible material and having a radial slit to permit it to be placed over the enlarged portion of the first mentioned member and having an inwardly extending projection to co-act with said enlarged portion to prevent accidental removal from said first mentioned member.

THOMAS M. BRUDE.